Jan. 10, 1933.  G. H. STEELE  1,894,204
DIRECTION SIGNAL SWITCH
Filed Sept. 19, 1930
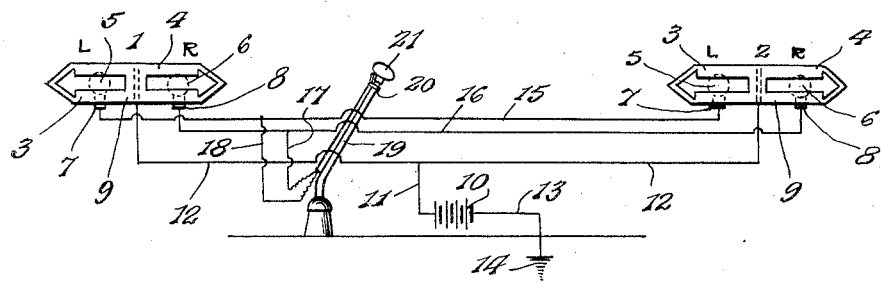
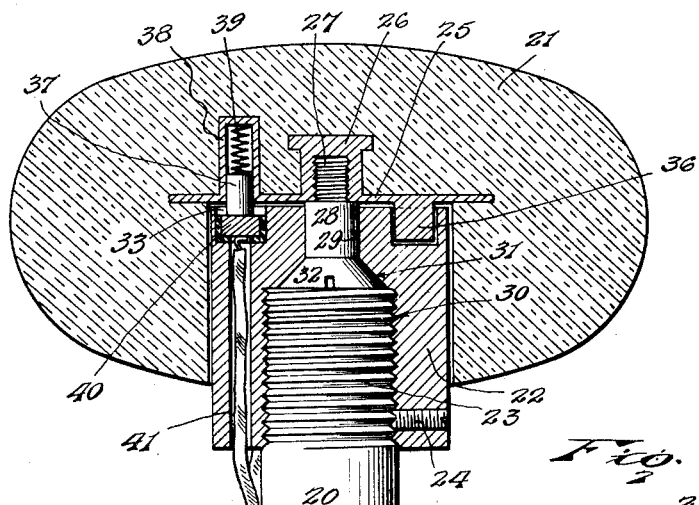
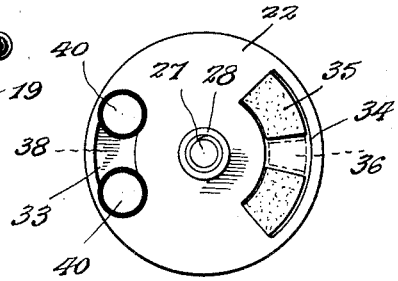
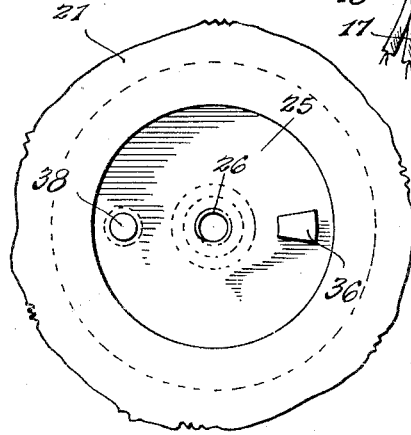
Inventor
G. H. Steele.
By Lacey & Lacey, Attorneys Patented Jan. 10, 1933

1,894,204

UNITED STATES PATENT OFFICE

GEORGE H. STEELE, OF NASHVILLE, TENNESSEE

DIRECTION SIGNAL SWITCH

Application filed September 19, 1930. Serial No. 483,088.

This invention relates to direction signal switch and more particularly to a device of this character intended to be applied to an automobile and by means of which the intention of the driver to make a right or left hand turn may be indicated.

At the present time direction indicators are applied to automobiles but they are controlled by switches or other mechanism which are inconvenient to reach, and, therefore, one object of this invention is to provide an improved circuit closer or switch so constructed that it may be mounted in the knob or hand-hold of the gear shift lever where it will be within easy reach of the operator of the automobile.

Another object of the invention is to so construct the improved circuit closer that it may constitute a mounting for connecting the hand-hold with the upper end of the gear shift lever.

Another object of the invention is to allow the knob or hand-hold to be turned in order to properly close a circuit through front and rear signals when a right or left hand turn is to be made, the knob normally remaining in such position that the circuit will be broken.

Another object of the invention is to provide a circuit closer which may be easily applied to a gear shift lever of a conventional construction and to so form the circuit closer that it will be simple in construction and very compact.

The invention is illustrated in the accompanying drawing, wherein

Figure 1 is a diagrammatic view of the improved direction signal,

Fig. 2 is an enlarged view showing the upper portion of the gear shift lever in elevaton and the hand-hold or knob and circuit closer in section, Fig. 3 is a view of the knob with the gear shift lever engaging elements of the circuit closer removed, and Fig. 4 is a top plan view of the socket or gear shift lever engaging element.

This improved direction signalling apparatus consists of a front signal, indicated in general by the numeral 1, and a rear signal, indicated in general by the numeral 2, but it is to be understood that, if so desired, the front signal may be omitted. Each of these signals has left and right hand indicators 3 and 4 adapted to be illuminated by bulbs 5 and 6 mounted in sockets 7 and 8 carried by the casing 9 of the signal and to one side of a battery 10 is attached a wire 11 having branches 12 secured to the respective casings 9. It will be obvious that, if so desired, the wires 12 may be secured to terminals carried by the shells of the sockets. From the other side of the battery extends a wire 13 which is grounded, as shown at 14. Wires 15 and 16 connect center terminals of the sockets 7 and 8 and from these wires extend wires 17 and 18 which extend into the body of an automobile upwardly along the gear shift lever 19 where they are secured by one or more clamps 20. A hand-hold or knob 21 which may be formed of glass or any other desired material is mounted at the upper end of the gear shift lever and this knob is connected with the lever by securing means which also serves as a switch or circuit closer by means of which a circuit may be established through the bulbs of the left or right hand indicators by turning the knob. It will thus be seen that the circuit closer or switch is associated with the knob and will, therefore, be within easy reach of the driver of the automobile.

The socket or body 22 of the circuit closer is internally threaded for engagement with the threaded upper end portion 23 of the gear shift lever and carries a set screw 24 to bear against the threads, as shown in Figure 2, and firmly hold the socket in place after being secured tightly upon the gear shift lever. A plate 25 is embedded in the knob and is formed with an internally threaded socket 26 which projects upwardly in axial alinement with the gear shift lever. This internally threaded socket 26 receives the reduced threaded end portion 27 of a bolt 28 passed upwardly through a passage 29 leading from the upper end of the threaded bore 30 and the lower portion of the passage is enlarged, as shown at 31, so that the head 32 of the bolt may be counter-sunk. This head bears against the upper end of the gear shift lever, thereby establishing a connection between the metal plate or disk 25 and the gear shift lever. The body or socket 22 is formed of insulating material and its upper end is formed at diametrically opposed points with circumferentially extending recesses 33 and 34. Abutments 35 which preferably consist of blocks of rubber are disposed in end portions of the recess 34 and between these yieldable abutments extends a lug 36 formed upon and extending downwardly from the under face of the plate 25. By this arrangement the knob will be permitted to be turned either toward the right or left about the body or socket 22, but it will be yieldably retained in its normal or neutral position. Therefore, the contact 37 slidably mounted in a pocket 38 and urged downwardly into the recess 33 by a spring 39 will be normally disposed between stationary contacts 40 mounted in the body or socket 22 at opposite ends of the recess 33. It will thus be seen that under normal conditions the direction signal will be inactive as the circuit will be broken but that by turning the knob towards the left or right the movable contact 37 will be brought into engagement with a desired one of the stationary contacts 40 and a circuit closed through the bulbs of either the left or right hand indicators by way of the wire 18 or the wire 17. These wires extend upwardly through passages 41 formed in the socket 22 and have their upper ends secured to the stationary contacts, as shown in Figure 2. When the knob is turned to move the contact 37 into engagement with one of the stationary contacts, a circuit will be established by way of the wire 17 or 18 and its stationary contact through the movable contact and the plate 25 to the screw or bolt 28 and through this bolt to the gear shift lever which is grounded so that the current may return to the battery.

I have, therefore, provided a direction signal including a circuit closer so constructed that it may be incorporated in the knob of the gear shift lever and may be very easily reached by the operator of the automobile. I have further provided a circuit closer which may serve not only as a circuit closer but also as means for connecting the handhold or knob with the gear shift lever.

Having thus described the invention, I claim:

For use with the gear shift lever of an automobile, a switch, said switch comprising a body part of insulation adapted to be fixed on the lever, and a top part mounted to rotate on the body part, the body part having spaced recesses in its upper end, stationary contacts in the ends of one recess, cushions in the ends of another recess, a plate embedded in the top part and electrically and mechanically connected with the body part, a lug depending from the plate into the recess containing the cushions and normally held by the cushions midway the ends of said recess, and a contact carried by the plate to engage either of the first-mentioned contacts and normally disposed between and out of contact therewith.

In testimony whereof I affix my signature.

GEORGE H. STEELE. [L. S.]